(12) United States Patent
Barclay et al.

(10) Patent No.: US 6,987,843 B1
(45) Date of Patent: Jan. 17, 2006

(54) NETWORK SUPPORT FOR FAX RETRY BLOCKING

(75) Inventors: Deborah Lewandowski Barclay, Winfield, IL (US); David S. Benco, Winfield, IL (US); Sanjeev Mahajan, Naperville, IL (US); Thomas Lee McRoberts, Naperville, IL (US); Raymond Leroy Ruggerio, Glenview, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 10/954,460

(22) Filed: Sep. 30, 2004

(51) Int. Cl.
*H04M 11/00* (2006.01)

(52) U.S. Cl. .......................... 379/100.06; 379/100.01; 379/210.02; 358/468

(58) Field of Classification Search .............................. 379/100.01–100.16, 93.02, 210.02; 358/400, 358/440, 468, 442
See application file for complete search history.

(56) References Cited

U.S. PATENT DOCUMENTS

| | | | |
|---|---|---|---|
| 6,239,881 B1 * | 5/2001 | Shaffer et al. | 379/100.06 |
| 6,256,116 B1 * | 7/2001 | Nawrocki | 358/442 |
| 6,721,059 B1 * | 4/2004 | Sturgeon et al. | 358/468 |
| 6,721,071 B1 * | 4/2004 | Maruyama | 358/440 |
| 2004/0146153 A1 * | 7/2004 | Solin | 379/210.02 |
| 2005/0012966 A1 * | 1/2005 | Mitchell et al. | 379/100.05 |

\* cited by examiner

*Primary Examiner*—Wing Chan

(57) ABSTRACT

A method is provided for fax call blocking. The method includes: receiving a first call intended for an end instrument (10) employed by a user; obtaining a telephone number from which the first call originated; comparing the obtained telephone number against a first database (42) to determine if the obtained telephone number matches a blocked telephone number contained in the first database (42); blocking the first call such that the end instrument (10) is not alerted if a match is found between the obtained telephone number and a blocked telephone number, otherwise providing a connection to the end instrument (10) for the first call; monitoring the connection to detect for fax tone; and, entering the obtained telephone number in the database (42) as a blocked telephone number if fax tone is detected.

20 Claims, 2 Drawing Sheets

US 6,987,843 B1

NETWORK SUPPORT FOR FAX RETRY BLOCKING

FIELD

The present inventive subject matter relates to the telecommunication arts. Particular application is found in conjunction with telecommunication switches (e.g., a class 5 switch such as the 5ESS and/or other like telecommunication switches), and the specification makes particular reference thereto. However, it is to be appreciated that aspects of the present inventive subject matter are also amenable to other like applications, e.g., without limitation, a mobile switching center (MSC) serving a mobile station (MS) and/or wireless subscriber.

BACKGROUND

The operation of facsimile or fax machines are generally well known in the telecommunication arts. In a typical scenario, the sending fax machine places a call to a dialed telephone phone, e.g., over the Public Switched Telephone Network (PSTN). The PSTN routes the call to the dialed telephone number, i.e., the receiving end node. At the receiving end, the call is presumably answer by a receiving fax machine. Once the call is connected, the sending fax machine provides a fax call set-up tone or series of tones, generally referred to as fax tone, that is sent to the receiving end. The fax tone identifies the call from the sending fax machine as a fax transmission. In response to recognition of the fax tone by the receiving fax machine, the two fax machines negotiate parameters for delivery of the fax transmission.

Upon successful delivery of a fax transmission, confirmation of the same is usually obtained by the sending fax machine. Fax machines are often programmed to repeatedly attempt delivery of a fax until a successful delivery is confirmed. However, delivery failure can result, e.g., because the call was never answered at the receiving end. Additionally, delivery failure can result when, even though the call may be answered at the receiving end, the end instrument is not a fax machine or is incapable of recognizing the fax tone, e.g., when the end instrument is a telephone. This latter situation can be quite frustrating and/or annoying for the subscriber or end user at the receiving end, particularly, when the sending fax machine repeatedly attempts to deliver the fax, thereby calling the subscriber or end user at the dialed telephone number numerous times.

Absent provisions otherwise, an end users has limited options for dealing with a fax machine that repeatedly calls them on their telephone or other non-fax end instrument. For example, they may simply answer the calls each time, only to listen to the fax tone, or they may ignore them and/or not answer the calls. These options, however, result in a delivery failure, and a fax machine programmed for repeated delivery attempts, until successful, will merely call back again. The problem is therefore not ideally addressed in this manner. Another option is for the end user to unplug their telephone or turn off its ringer or other alerting mechanism. This solution is however undesirable insomuch as there is a risk of missing other desired calls.

Accordingly, a new and improved method and/or system is disclosed that overcomes the above-referenced problems and others.

SUMMARY

In accordance with one embodiment, a method is provided for fax call blocking. The method includes: receiving a call intended for an end instrument employed by a user; obtaining a telephone number from which the call originated; comparing the obtained telephone number against a database to determine if the obtained telephone number matches a blocked telephone number contained in the database; blocking the call such that the end instrument is not alerted if a match is found between the obtained telephone number and a blocked telephone number, otherwise providing a connection to the end instrument for the call; monitoring the connection to detect for fax tone; and, entering the obtained telephone number in the database as a blocked telephone number if fax tone is detected.

In accordance with another embodiment, a system provides a fax call blocking feature to a user. The system includes: means for receiving a call intended for an end instrument employed by the user; means for obtaining a telephone number from which the call originated; means for comparing the obtained telephone number against a database to determine if the obtained telephone number matches a blocked telephone number contained in the database; means for blocking the call such that the end instrument is not alerted if a match is found between the obtained telephone number and a blocked telephone number, otherwise providing a connection to the end instrument for the call; means for monitoring the connection to detect for fax tone; and, means for entering the obtained telephone number in the database as a blocked telephone number if fax tone is detected.

In accordance with yet another embodiment, a system provides a fax call blocking feature. The system includes: a database in which one or more blocked telephone numbers are maintained; a telecommunications switch, the telecommunications switch having access to the database; and, a detector that monitors a connection established by the telecommunications switch for fax tone. The telecommunications switch operative to: receive a call intended for an end instrument served by the telecommunications switch; obtain a telephone number from which the call originated; compare the obtained telephone number against the database to determine if the obtained telephone number matches a blocked telephone number contained in the database; blocking the call such that the end instrument is not alerted if a match is found between the obtained telephone number and a blocked telephone number, otherwise providing a connection to the end instrument for the call; and, enter the obtained telephone number in the database as a blocked telephone number if fax tone is detected on the connection by the detector.

Numerous advantages and benefits of the inventive subject matter disclosed herein will become apparent to those of ordinary skill in the art upon reading and understanding the present specification.

BRIEF DESCRIPTION OF THE DRAWINGS

The inventive subject matter may take form in various components and arrangements of components, and in various steps and arrangements of steps. The drawings are only for purposes of illustrating preferred embodiments and are not to be construed as limiting. Further, it is to be appreciated that the drawings are not to scale.

DETAILED DESCRIPTION OF PREFERRED EMBODIMENTS

For clarity and simplicity, the present specification shall refer to structural and/or functional elements, entities and/or facilities, relevant communication standards, protocols and/or services, and other components that are commonly known in the telecommunications art without further detailed explanation as to their configuration or operation except to the extent they have been modified or altered in accordance with and/or to accommodate the preferred embodiment(s) presented herein.

Figure 1:
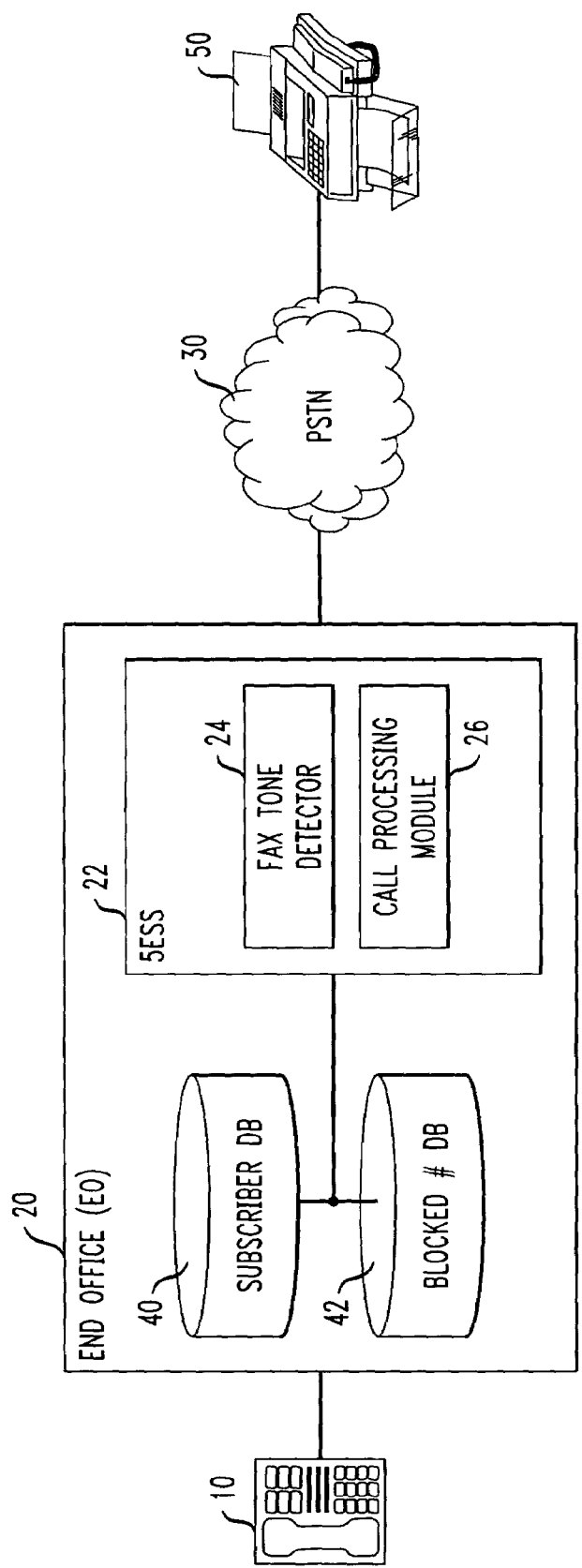
FIG. 1 is a block diagram illustrating an exemplary telecommunications network suitable for practicing aspects of the present inventive subject matter.

With reference to FIG. 1, a subscriber or end user has or is provided with an end instrument (EI) 10, e.g., the illustrated telephone or another non-fax telecommunication end instrument, end user terminal, customer premises equipment (CPE) or the like, served by an end office (EO) 20 that is operatively connected to a public switched telephone network (PSTN) 30 in the usual manner. The EO 20 includes a telecommunications switch 22 (e.g., a class 5 switch such as the 5ESS, another SS7 (Signaling System 7) switch, or the like) to which the EI 10 is operatively connected in the usual manner, e.g., via a wireline or landline. As is understood in the art, the end user and/or EI 10 is designated by or otherwise assigned a telephone number or directory number (DN) for routing calls thereto. While for simplicity and clarity herein only one EI 10 and EO 20 are illustrated in the present example, it is to be appreciated that a single EO suitably serves a plurality of similarly situated EIs and that a plurality of such EOs are similarly equipped and likewise arranged with respect to the PSTN 30.

As shown, the EO 20 includes a subscriber database (DB) 40 that is selectively accessed by the switch 22 to check on the status of a subscriber's subscription. For example, the DB 40 suitably contains information identifying which end users served by the EO 20 subscribe to a fax call blocking service and/or feature, and optionally, if the service/feature is activated or deactivated. Optionally, the service/feature is selectively activated and/or deactivated by a subscriber, e.g., entering a designated feature with their EI 10. When activated, the service/feature permits a subscriber to automatically block incoming calls originating from a telephone number that has been previously associated with an offending fax machine (e.g., fax machine 50) re-attempting to deliver a fax to the EI 10.

Optionally, the EO 20 also includes a blocked # DB 42 that is selectively accessed by the switch 22 to check if an incoming call intended for the end user or EI 10 is to be blocked, i.e., if it is originating from a blocked telephone number. As will be described later herein, if the fax call blocking service/feature is activated for the end user and/or EI 10, a telephone number is automatically placed in the DB 42 when it is associated with an offending fax machine attempting delivery of a fax to the EI 10. The DB 42 optionally maintains a running list of blocked telephone numbers, such that blocked telephone numbers remain on the list indefinitely. Accordingly, once a telephone number is associated with an offending fax machine, calls originating from that telephone number are blocked indefinitely, that is, so long as the service/feature is activated.

Alternately, only the most recent telephone number designated for blocking is maintained in the DB 42. For example, when a new telephone number is designated for blocking, it replaces the current one in the DB 42. In yet another embodiment, one or more blocked telephone numbers are maintained in the DB 42 for a set or otherwise determined period of time, e.g., each blocked telephone number optionally remains in the DB 42 for a fix period of time after it is placed therein, or a single blocked telephone number optionally remains in the DB 42 until there is an incoming call originating from a telephone number other than the currently blocked telephone number, after which it is removed. Accordingly, at some future time, calls originating from a previously blocked telephone number are again allowed.

Suitably, the switch 22 includes a fax tone detector (FTD) 24, and a call processing module (CPM) 26. The FTD 24 is responsible for listening to or otherwise observing an established connection to the EI 10 to detect and/or recognize fax tone being sent to the EI 10. The CPM 26 is responsible for and/or regulates the call setup and call processing of the switch 22 in the usual manner. Suitably, the CPM 26 is also responsible administering and/or controlling the fax call blocking service/feature.

Figure 2:
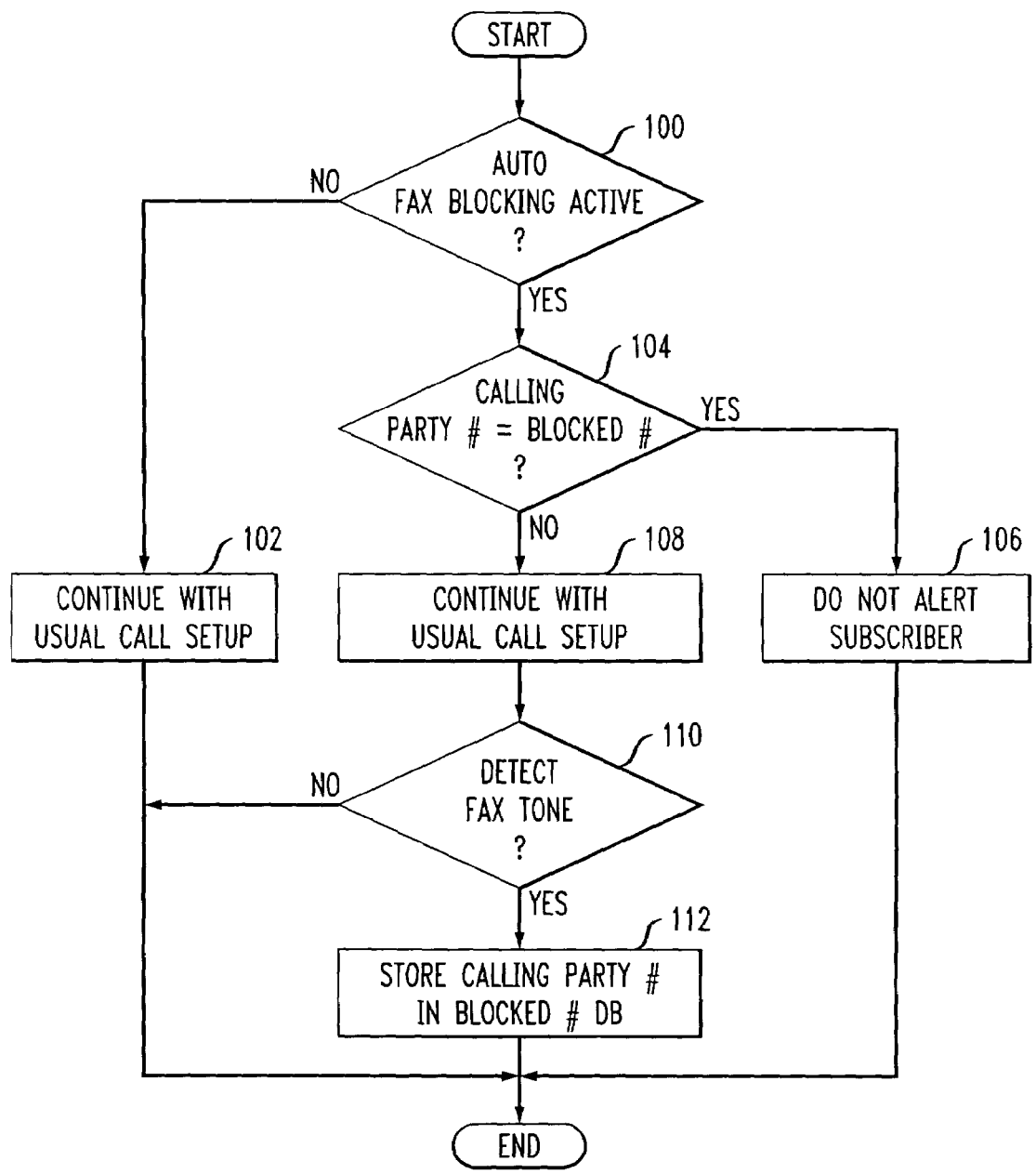
FIG. 2 is a flow chart showing an exemplary process embodying aspects of the present inventive subject matter.

With reference to FIG. 2, a flow chart provides an example of how the CPM 26 administers the fax call blocking service/feature for an incoming call handled by the switch 22 and directed to the telephone number of or otherwise intended for the EI 10. At decision step 100, it is determined if the service/feature is active. For example, the switch 22 (optionally, under the direction of the CPM 26) queries the subscriber DB 40 to check if the end user is a subscriber to the service/feature, and if so, if the service/feature is activated. If the end user is not a subscriber or the service/feature is deactivated, then the process branches to step 102. At step 102, the switch 22 handles call setup and/or processing in the otherwise usual manner, and the process is ended.

Alternately, if the end user is a subscriber and the service/feature is activated, then the process branches to decision step 104. At decision step 104, it is determined if the incoming call is originating from a blocked telephone number. For example, the switch 22 (optionally, under the direction of the CPM 26) queries the blocked # DB 42 to check if the incoming call's originating telephone number matches a blocked telephone in the DB 42. Suitably, the telephone number from which the incoming call originated is identified by the switch 22 via caller-ID or a similar service or function. If a match is found, then the process branches to step 106. This means that the incoming call's originating telephone number has previously been associated with an offending fax machine (e.g., fax machine 50). That is to say, the offending fax machine has on a prior occasion attempted to deliver a fax to the EI 10 and has therefore had the originating telephone number from which it previously called placed in the DB 42. Accordingly, this current attempt to redeliver the fax is, at step 106, blocked by the switch 22 such that the EI 10 does not ring or is not otherwise alerted, and the process is ended. Optionally, however, distant ringing is still provided to the calling fax machine 50.

Alternately, if no match is found at decision step 104, then the process continues to step 108. At step 108, the switch 22 handles call setup and/or processing in the otherwise usual manner. Assuming the call is answered, a connection is established with the EI 10 at or about which time, if the call is a fax transmission, the calling fax machine would send fax tone to the EI 10 over the connection. Of course, however, if the call is not a fax transmission, then typically no fax tone is sent to the EI 10 over the connection. At decision step 110, it is determined if fax tone is being sent to the EI 10 over the connection. For example, the FTD 24 monitors the connection to see if fax tone is detected. If no fax tone is detected, then the call proceeds otherwise normally, and the process is ended. However, if fax tone is detected, then the process continues to step 112.

At step 112, the telephone number from which the fax call originated is placed in the blocked # DB 42, and the process is ended. Accordingly, subsequent calls from the same telephone number are blocked by the switch 22 in accordance with the process flow previously described herein. In this manner, repeated attempts to deliver a fax to the EI 10 are thwarted without the undesirable reoccurring alerting of the EI 10. The subscriber and/or EI 10, however, still receives desired calls originating from other telephone numbers in the usual manner.

The fax call blocking service/feature has been shown and described for use in a landline or wireline application, i.e., for a subscriber using the EI 10 served by EO 20. Optionally, however, in an alternate embodiment, the fax call blocking service/feature is made available to wireless subscribers operating in a wireless telecommunications network or environment, e.g., employing a wireless mobile terminal or mobile station (MS) served by a mobile switching center (MSC). Suitably, in such an application, the service/feature is supported by the MSC which is equipped with similar network elements for implementing the fax call blocking service/feature in a similar fashion.

It is to be appreciated that in connection with the particular exemplary embodiments presented herein certain structural and/or function features are described as being incorporated in defined elements and/or components. However, it is contemplated that these features may, to the same or similar benefit, also likewise be incorporated in other elements and/or components where appropriate. It is also to be appreciated that different aspects of the exemplary embodiments may be selectively employed as appropriate to achieve other alternate embodiments suited for desired applications, the other alternate embodiments thereby realizing the respective advantages of the aspects incorporated therein.

It is also to be appreciated that particular elements or components described herein may have their functionality suitably implemented via hardware, software, firmware or a combination thereof. Additionally, it is to be appreciated that certain elements described herein as incorporated together may under suitable circumstances be stand-alone elements or otherwise divided. Similarly, a plurality of particular functions described as being carried out by one particular element may be carried out by a plurality of distinct elements acting independently to carry out individual functions, or certain individual functions may be split-up and carried out by a plurality of distinct elements acting in concert. Alternately, some elements or components otherwise described and/or shown herein as distinct from one another may be physically or functionally combined where appropriate.

In short, the present specification has been set forth with reference to preferred embodiments. Obviously, modifications and alterations will occur to others upon reading and understanding the present specification. It is intended that the invention be construed as including all such modifications and alterations insofar as they come within the scope of the appended claims or the equivalents thereof.

What is claimed is:

1. A method of fax call blocking, said method comprising:
   (a) receiving a first call intended for an end instrument employed by a user;
   (b) obtaining a telephone number from which the first call originated;
   (c) comparing the obtained telephone number against a first database to determine if the obtained telephone number matches a blocked telephone number contained in the first database;
   (d) blocking the first call such that the end instrument is not alerted if a match is found between the obtained telephone number and a blocked telephone number, otherwise providing a connection to the end instrument for the first call;
   (e) monitoring the connection to detect for fax tone; and,
   (f) entering the obtained telephone number in the database as a blocked telephone number if fax tone is detected.

2. The method of claim 1, further comprising:
   before step (b), determining if the user is a subscriber to a fax call blocking feature, such that steps (b) through (f) are performed if the user is a subscriber, and steps (b) through (f) are omitted if the user is not a subscriber.

3. The method of claim 2, further comprising:
   checking a second database containing subscriber information to determine if the user is a subscriber to the fax call blocking feature.

4. The method of claim 1, further comprising:
   before step (b), determining if a fax call blocking feature has been activated, such that steps (b) through (f) are performed if the feature is activated, and steps (b) through (f) are omitted if the feature is not activated.

5. The method of claim 4, wherein the fax call blocking feature is selectively activated and deactivate by the user entering a designated feature code with the end instrument.

6. The method of claim 1, wherein steps (a) through (f) are performed at an end office serving the end instrument.

7. The method of claim 6, wherein the end instrument is a telephone.

8. The method of claim 1, wherein steps (a) through (f) are preformed at a mobile switching center serving the end instrument.

9. The method of claim 8, wherein the end instrument is a wireless mobile station.

10. The method of claim 1, wherein a blocked telephone number is maintained in the first database for a set amount of time after being entered therein.

11. The method of claim 1, wherein a blocked telephone number is maintained in the first database for an indefinite amount of time after being entered therein.

12. The method of claim 1, wherein a blocked telephone number is maintained in the first database until another call subsequent to the first call is connected to the end instrument, said subsequent call originating from a telephone number different than the blocked telephone number.

13. A system for providing a fax call blocking feature to a user, said system comprising:
   means for receiving a first call intended for an end instrument employed by the user;
   means for obtaining a telephone number from which the first call originated;
   means for comparing the obtained telephone number against a first database to determine if the obtained telephone number matches a blocked telephone number contained in the first database;
   means for blocking the first call such that the end instrument is not alerted if a match is found between the obtained telephone number and a blocked telephone number, otherwise providing a connection to the end instrument for the first call;

means for monitoring the connection to detect for fax tone; and, means for entering the obtained telephone number in the database as a blocked telephone number if fax tone is detected.

14. The system of claim 13, further comprising:

means for determining if the user is a subscriber to the fax call blocking feature, such that the fax call blocking feature is enabled if the user is a subscriber, and the fax call blocking feature is disabled if the user is not a subscriber.

15. The system of claim 14, further comprising:

means for checking a second database containing subscriber information to determine if the user is a subscriber to the fax call blocking feature.

16. The system of claim 13, further comprising:

means for determining if the fax call blocking feature has been activated, such that the fax call blocking feature is enabled if the feature is activated, and the fax call blocking feature is disabled if the feature is not activated.

17. The system of claim 16, wherein the fax call blocking feature is selectively activated and deactivate by the user entering a designated feature code with the end instrument.

18. The system of claim 1, wherein the end instrument is a telephone served by an end office supporting the fax call blocking feature.

19. The system of claim 1, wherein the end instrument is a wireless mobile station served by a mobile switching center supporting the fax call blocking feature.

20. A system that provides a fax call blocking feature, said system comprising:

a database in which one or more blocked telephone numbers are maintained;

a telecommunications switch, said telecommunications switch having access to the database; and, a detector that monitors a connection established by the telecommunications switch for fax tone;

said telecommunications switch operative to:

receive a call intended for an end instrument served by the telecommunications switch;

obtain a telephone number from which the call originated;

compare the obtained telephone number against the database to determine if the obtained telephone number matches a blocked telephone number contained in the database;

blocking the call such that the end instrument is not alerted if a match is found between the obtained telephone number and a blocked telephone number, otherwise providing a connection to the end instrument for the call; and, enter the obtained telephone number in the database as a blocked telephone number if fax tone is detected on the connection by the detector.

* * * * *